(12) United States Patent
Broadhead et al.

(10) Patent No.: US 8,092,738 B2
(45) Date of Patent: Jan. 10, 2012

(54) METHOD FOR MOLDING AN INTEGRAL JOINT

(75) Inventors: Douglas G. Broadhead, Brampton (CA); Traian Miu, Oakville (CA)

(73) Assignee: Magna Closures Inc., Newmarket (CA)

( * ) Notice: Subject to any disclaimer, the term of this patent is extended or adjusted under 35 U.S.C. 154(b) by 388 days.

(21) Appl. No.: 12/305,096

(22) PCT Filed: Jun. 19, 2007

(86) PCT No.: PCT/CA2007/001113
§ 371 (c)(1),
(2), (4) Date: Dec. 16, 2008

(87) PCT Pub. No.: WO2007/147253
PCT Pub. Date: Dec. 27, 2007

(65) Prior Publication Data
US 2009/0174112 A1  Jul. 9, 2009

(51) Int. Cl.
*B28B 7/00* (2006.01)
*B28B 3/00* (2006.01)
*B29C 45/00* (2006.01)
*E05D 7/00* (2006.01)
*E05D 5/12* (2006.01)
*B28B 11/06* (2006.01)
*B29C 35/00* (2006.01)
*B29C 45/14* (2006.01)
*A23P 1/00* (2006.01)

(52) U.S. Cl. ............... 264/328.8; 264/242; 264/328.1; 16/221; 16/380; 425/330; 425/542; 425/588

(58) Field of Classification Search ............... 264/328.8; 425/330, 588
See application file for complete search history.

(56) References Cited

U.S. PATENT DOCUMENTS

| | | | | |
|---|---|---|---|---|
| 2,495,539 A * | 1/1950 | Natzler et al. | ................... | 24/429 |
| 3,000,049 A * | 9/1961 | Terry, Jr. | ........................ | 16/334 |
| 3,456,913 A * | 7/1969 | Lutz | ............................... | 249/63 |
| 3,737,270 A * | 6/1973 | Fiddler | ........................ | 425/542 |
| 3,785,217 A * | 1/1974 | Peura | ........................... | 474/190 |
| 4,049,231 A * | 9/1977 | Lutz | ............................... | 249/64 |
| 4,343,501 A | 8/1982 | Meeks | | |
| 4,573,239 A * | 3/1986 | Valenti et al. | ................... | 16/273 |
| 4,579,709 A * | 4/1986 | Ferreri | ........................ | 264/242 |
| 4,751,765 A * | 6/1988 | Wu | .............................. | 16/256 |
| 4,805,947 A | 2/1989 | Farris | | |

(Continued)

FOREIGN PATENT DOCUMENTS

DE      19958149 A1    6/2001

*Primary Examiner* — Christina Johnson
*Assistant Examiner* — Benjamin Schiffman
(74) *Attorney, Agent, or Firm* — Miller Canfield (57) ABSTRACT

A method is provided for molding an integral joint including a stationary member and an enclosure rotatable about the stationary member. The method utilizes a joint formation assembly defining an inner cavity, a first passageway connected to the inner cavity, an outer cavity surrounding the inner cavity, and a second passageway connected to the outer cavity. The method includes the steps of: introducing moldable material into the inner cavity from the first passageway to form the stationary member; introducing moldable material into the outer cavity from the second passageway to form the enclosure; and divorcing the inner cavity from the outer cavity for separately and independently forming the enclosure around the stationary member to allow rotatable movement of the enclosure about the stationary member.

10 Claims, 8 Drawing Sheets

U.S. PATENT DOCUMENTS

| | | |
|---|---|---|
| 4,979,264 A | 12/1990 | Ramsauer |
| 5,372,491 A | 12/1994 | Fritsch et al. |
| 5,895,081 A | 4/1999 | Tanimoto et al. |
| 6,036,244 A | 3/2000 | Tyves et al. |
| 6,468,457 B2 | 10/2002 | Corrion et al. |
| 6,594,864 B2 | 7/2003 | Epp |
| 6,793,869 B2 | 9/2004 | Davis, Jr. et al. |
| 2007/0050945 A1 | 3/2007 | Koessler |
| 2007/0228603 A1* | 10/2007 | White et al. .......... 264/263 |
| 2008/0134466 A1* | 6/2008 | Massengill .......... 16/222 |

* cited by examiner

Fig. 8

METHOD FOR MOLDING AN INTEGRAL JOINT

FIELD OF THE INVENTION

The invention relates to a method and system of molding an integral joint. More particularly, the invention relates to a method of molding an integral joint including an enclosure rotatable about a stationary member.

DESCRIPTION OF RELATED ART

Molded articles are currently utilized in a wide variety of industries. Many of these molded articles include a joint or similar structure for connecting a first part to a second part. Typically, these joints have been formed with two distinct parts. First, a fixed member is molded into place. Then, a second molded member is secured to the fixed member. This two part process requires the use of fasteners or adhesives as well as secondary molding and installation operations.

SUMMARY OF THE INVENTION

According to one aspect of the invention, a method is provided for molding an integral joint including a stationary member and an enclosure rotatable about the stationary member. The method utilizes a joint formation assembly including an inner cavity, a first passageway connected to the inner cavity, an outer cavity surrounding the inner cavity, and a second passageway connected to the outer cavity. The method includes the steps of: introducing moldable material into the inner cavity from the first passageway to form the stationary member; introducing moldable material into the outer cavity from the second passageway to form the enclosure; and divorcing the inner cavity from the outer cavity for separately and independently forming the enclosure around the stationary member to allow rotatable movement of the enclosure about the stationary member.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE PREFERRED EMBODIMENT

Figure 1:
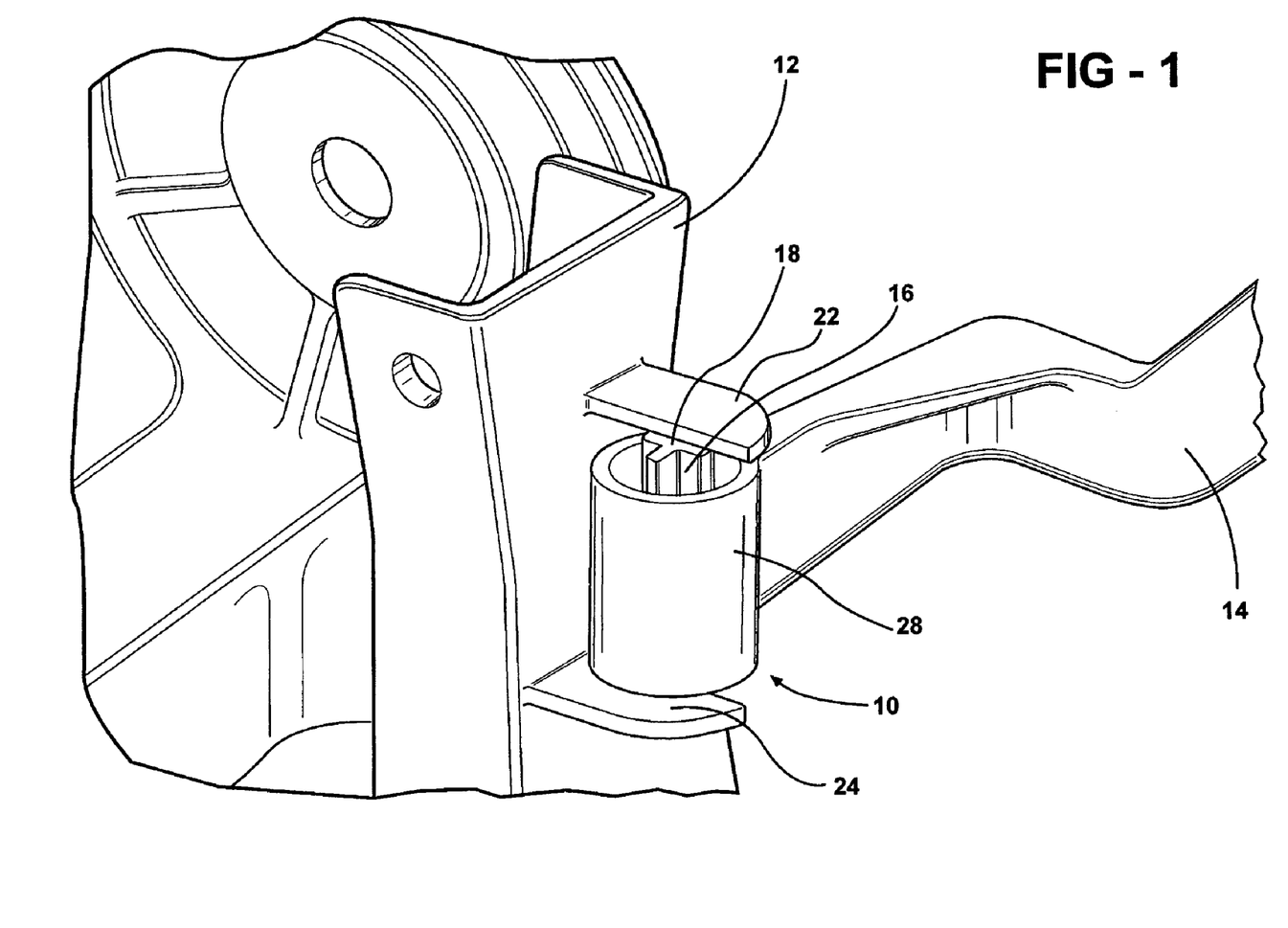
FIG. 1 is a perspective view of a molded, integral joint for connecting first and second parts.
Figure 2:
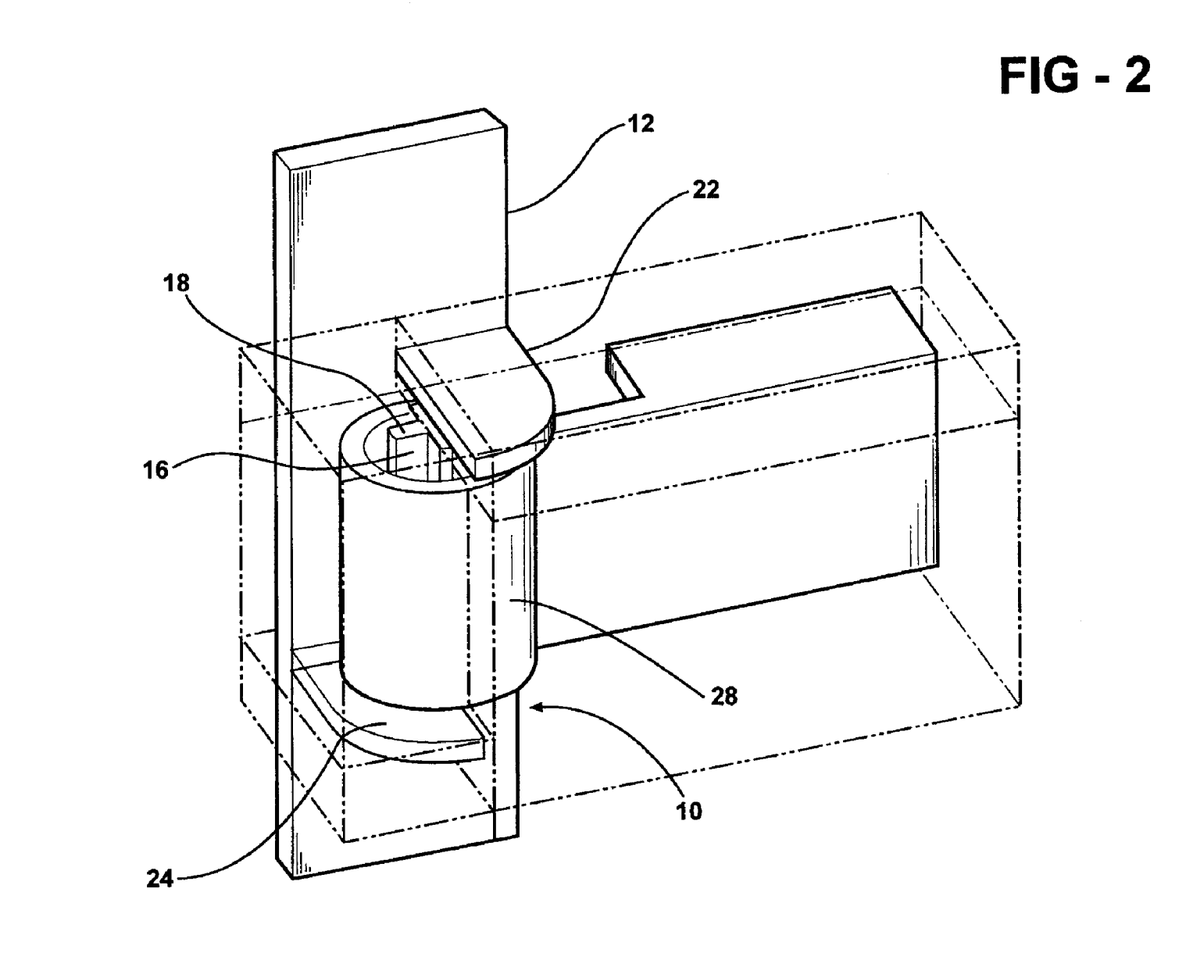
FIG. 2 is a another perspective view of the molded, integral joint connecting first and second parts.
Figure 3:
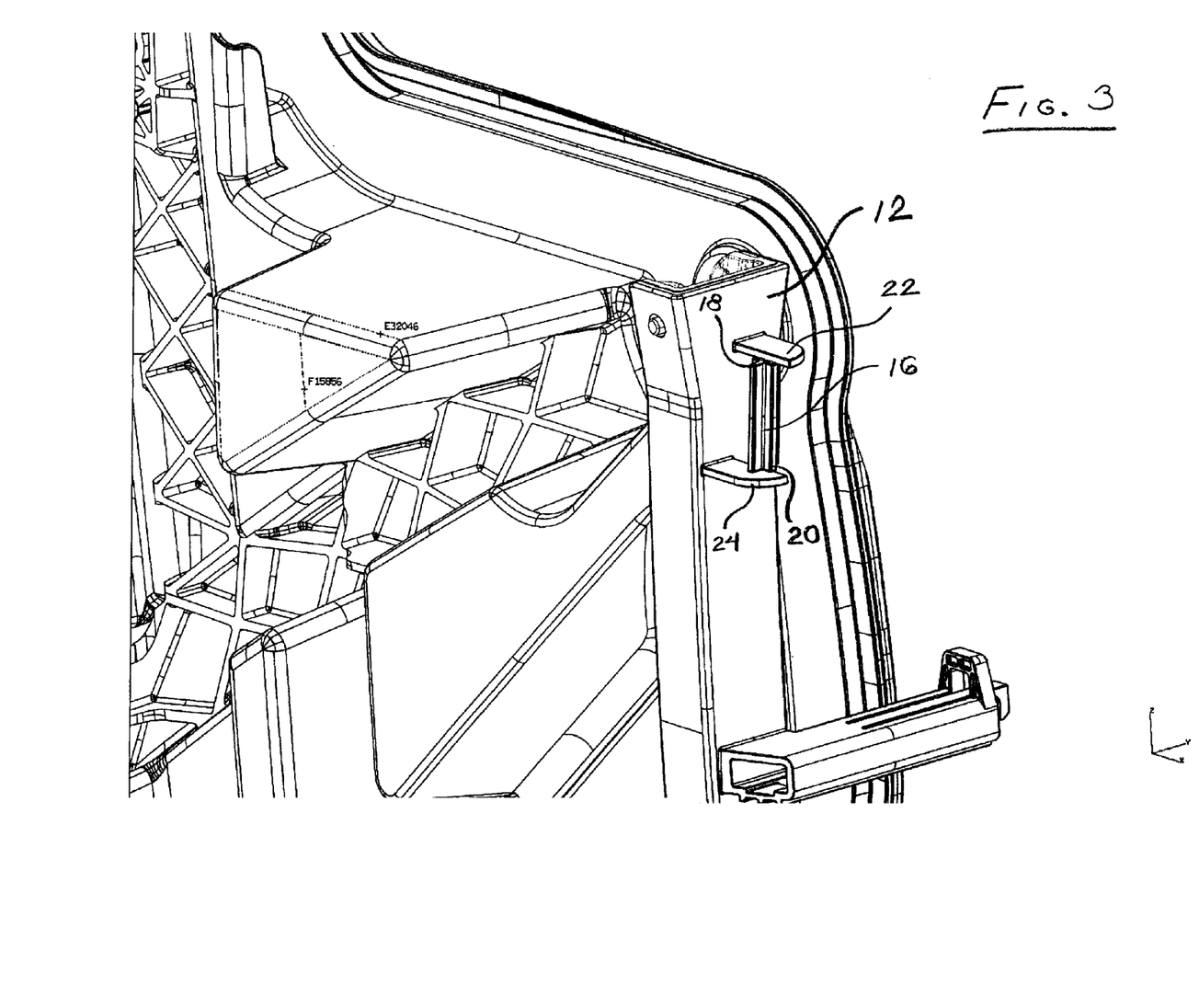
FIG. 3 is a perspective view, partially cut away, of a stationary member of the integral joint.

Referring to FIGS. 1 through 3, a molded, integral joint, generally shown at 10, connects first 12 and second 14 parts such that the second part 14 is rotatable relative to the first part 12. The integral joint 10 may be formed by injection molding or injection-compression molding. In the present embodiment, the first part 12 is a semi-structural panel for a motor vehicle and the second part 14 is a vehicle door handle assembly. It is, however, appreciated that the first 12 and second 14 parts may be any of numerous structures for use in any of a variety of industries.

The integral joint 10 includes a stationary member 16 extending between opposing ends 18, 20. A first tab 22 extends between one end 18 of the stationary member 16 and the first part 12. A second tab 24 is spaced apart from the first tab 22 and extends between the opposing end 20 of the stationary member 16 and the first part 12. Thus, the first 22 and second 24 tabs connect the stationary member 16 to the first part 12. The first 22 and second 24 tabs are offset from one another along the stationary member 16. It is appreciated that the shape of the first 22 and second 24 tabs may vary.

A rotatable member or enclosure 28 extends out from one end of the second part 14. The rotatable member 28 surrounds the stationary member 16 and is free to rotate relative thereto. More specifically, the rotatable member 28 is not secured or attached to the stationary member 16 or to the first 22 and second 24 tabs. The rotatable member 28 is maintained along the stationary member 16 by the first 22 and second 24 tabs.

Figure 8:
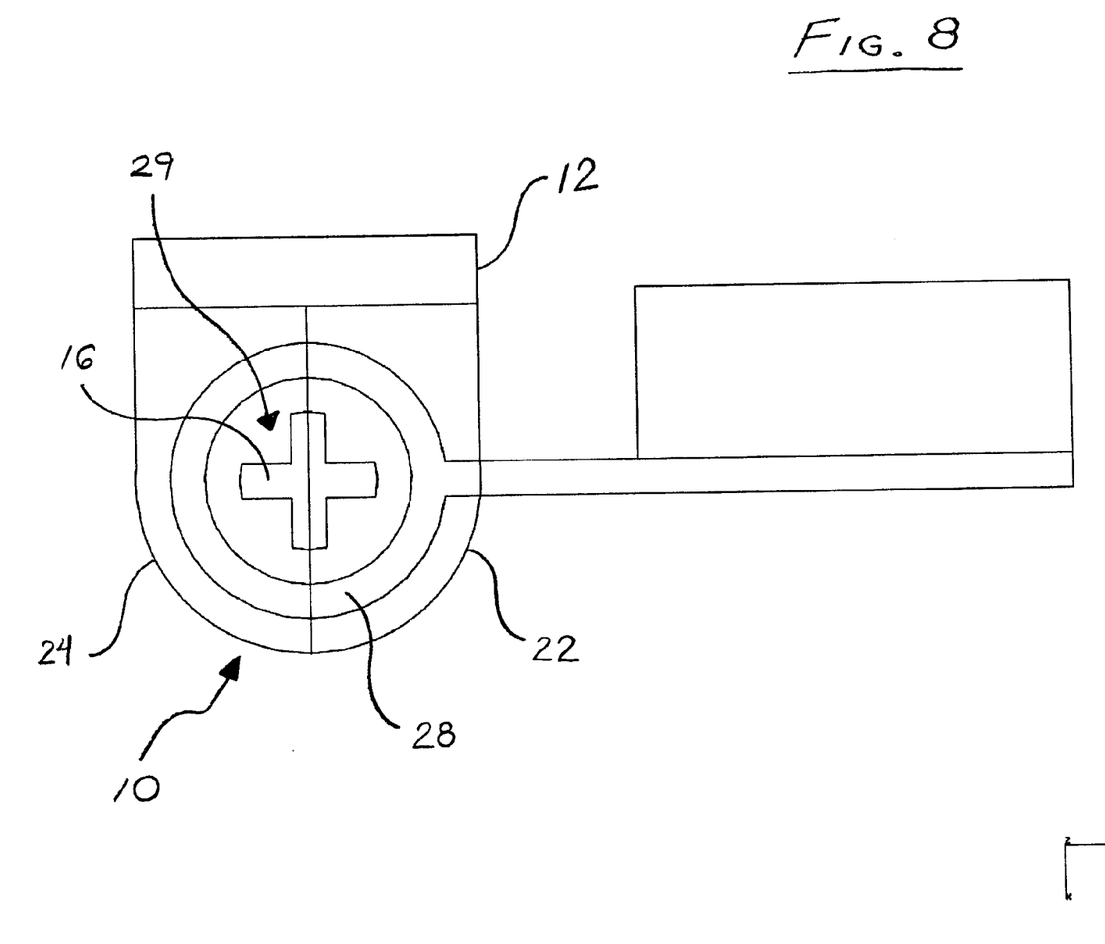
FIG. 8 is a top view of the integral joint.

The particular structure, configuration, and size of the stationary 16 and rotatable 28 members may vary. In accordance with these variations, one may vary a space 29 (shown in FIG. 8) between the stationary 16 and rotatable 28 members to increase or decrease the ability of the rotatable member 28 to rotate about the stationary member 16.

A method of molding the integral joint 10 is now described with reference to FIGS. 4 through 8. The method of molding the integral joint 10 utilizes a joint formation assembly, generally shown at 30, including a plurality of slides 32, 34, 36, 38. In the present embodiment, the plurality of slides includes first 32 and second 34 central slides and first 36 and second 38 end slides. When all of the slides 32, 34, 36, 38 are moved into a ready position, as shown in FIGS. 6 and 7, moldable material is injected into the joint formation assembly 30 to form the integral joint 10.

Figure 4:
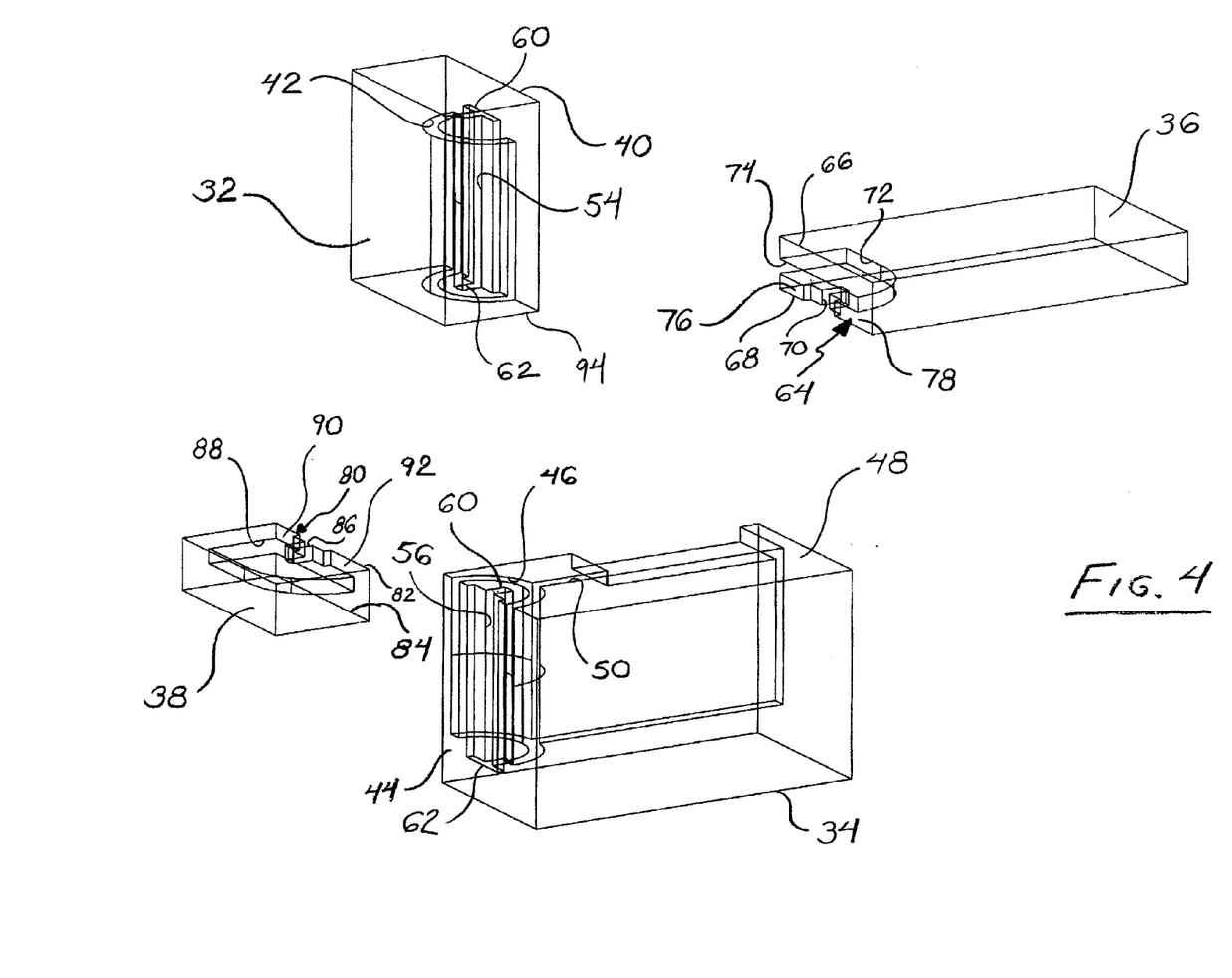
FIG. 4 is an exploded, perspective view of a joint formation assembly for molding the integral joint.
Figure 5:
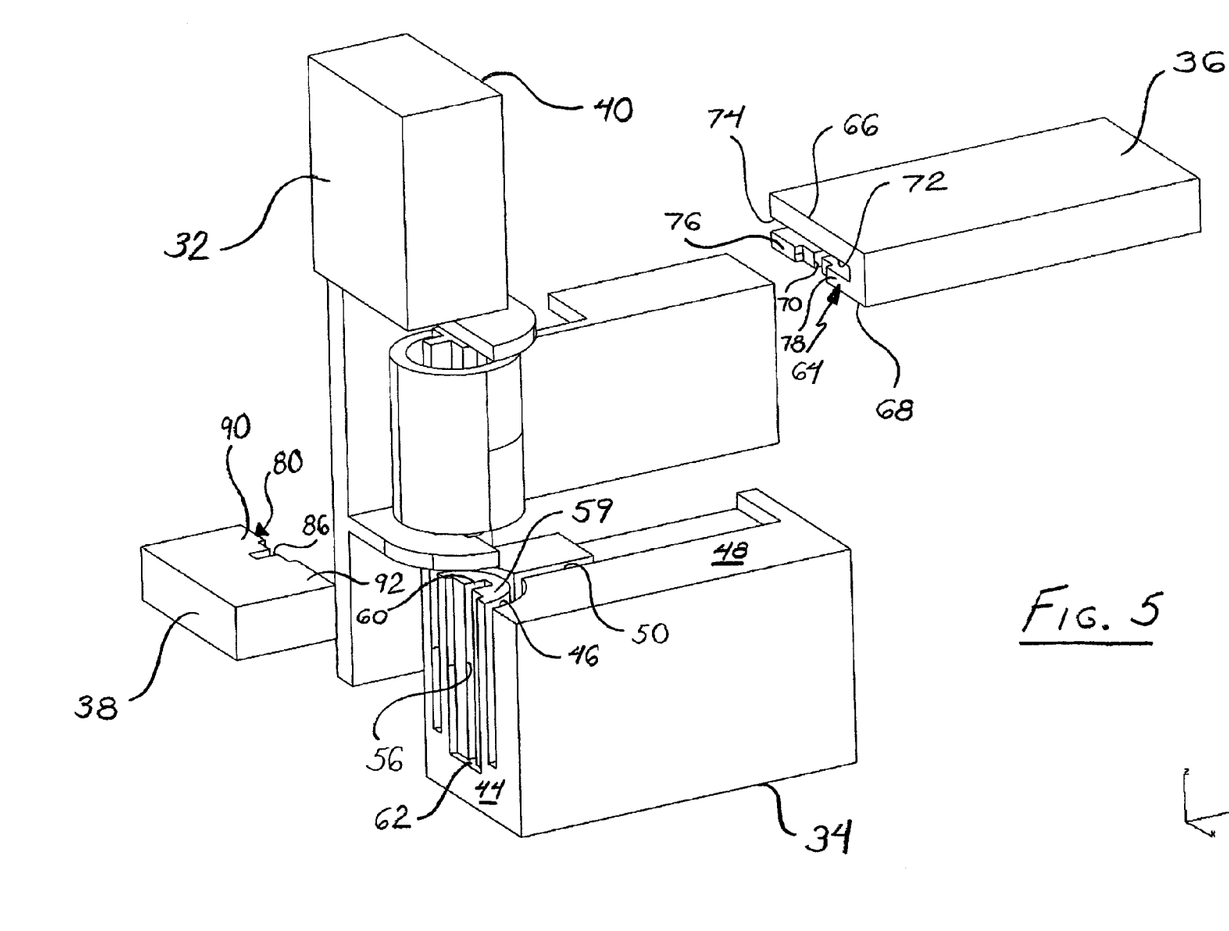
FIG. 5 is an exploded, perspective view of the joint formation assembly.

Referring now to FIGS. 4 and 5, the first central slide 32 includes an inboard surface 40 defining an outer cavity half 42. The second central slide 34 includes an inboard surface 44 defining an outer cavity half 46. In the present embodiment, each of the outer cavity halves 42, 46 has a semi-circular shape. The second central slide 34 also includes a top surface 48 defining a passageway 50. The passageway 50 is fluidly connected to the outer cavity half 46.

Figure 6:
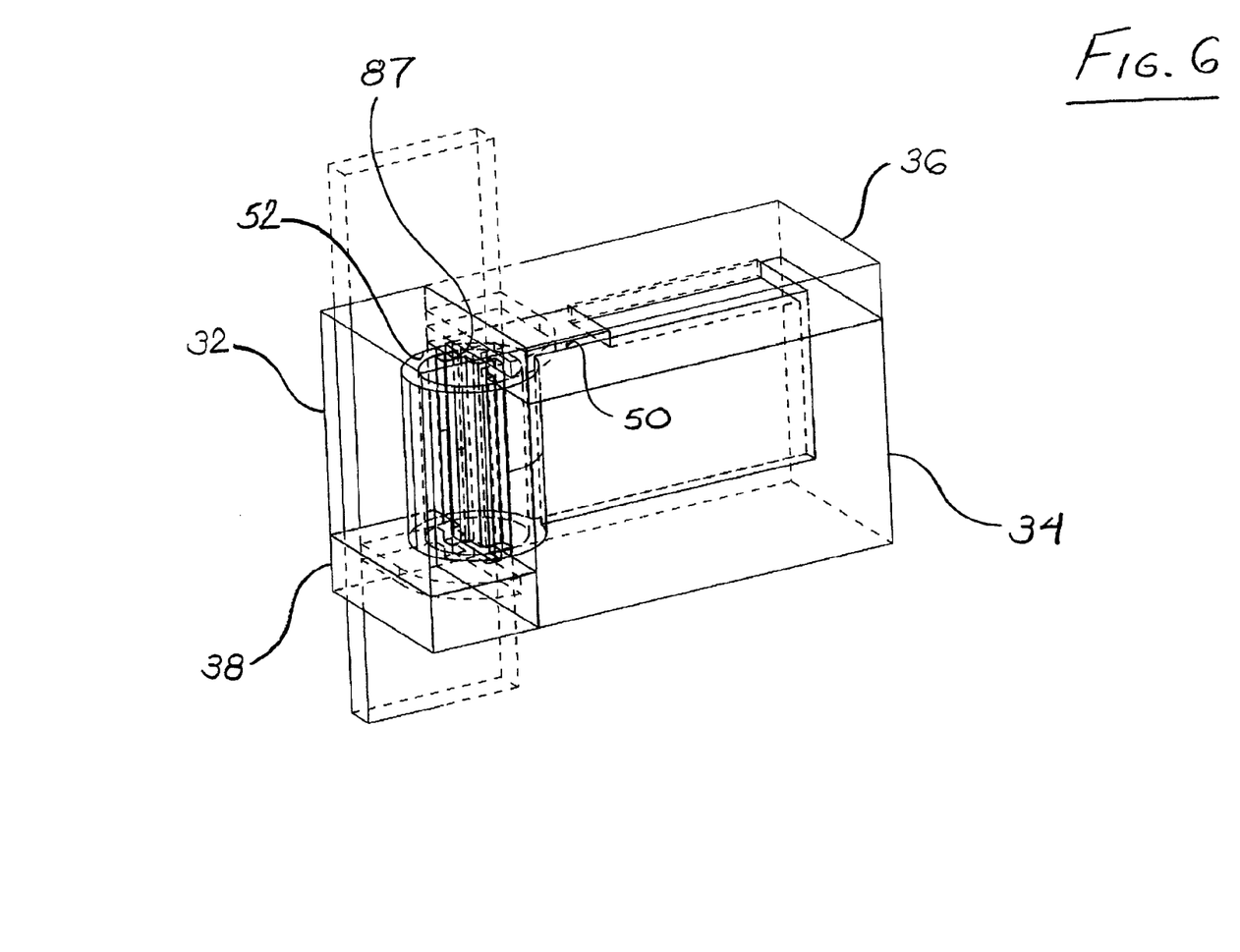
FIG. 6 is a perspective view of the joint formation assembly in a ready position.
Figure 7:
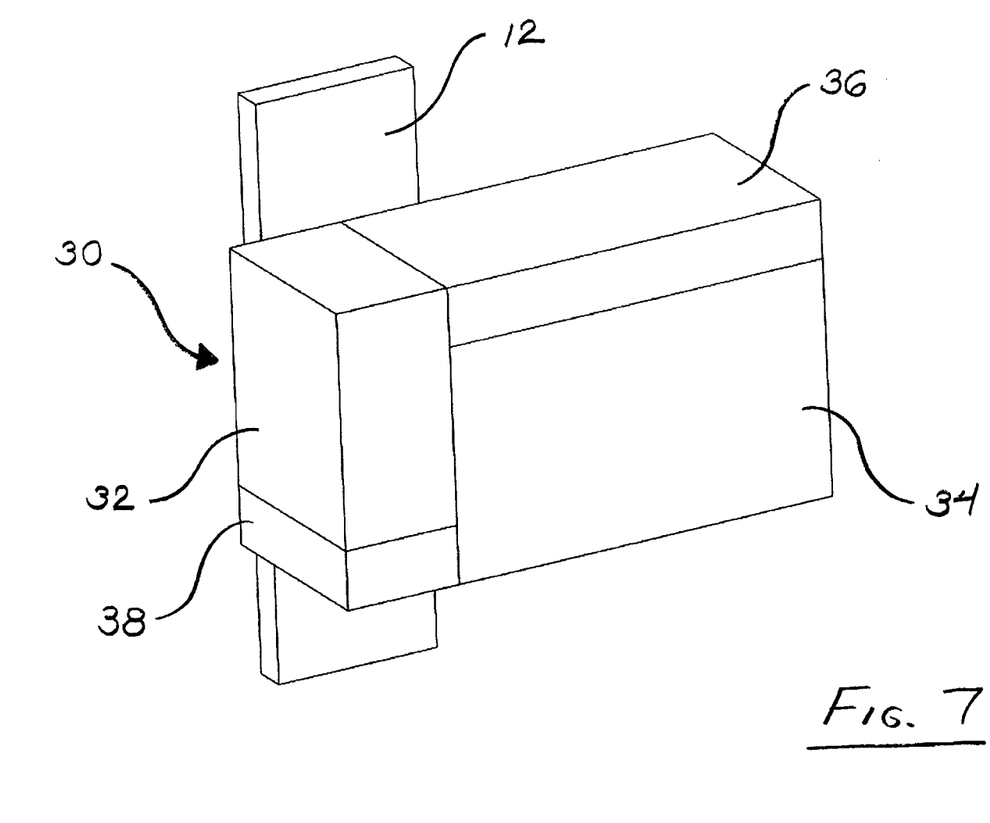
FIG. 7 is a perspective view of the joint formation assembly in the ready position.

When the joint formation assembly 30 is in the ready position, as shown in FIGS. 6 and 7, the first 32 and second 34 central slides are moved against one another so that the inboard surfaces 40, 44 abut one another. At this time, the outer cavity halves 42, 46 are aligned with one another to form a continuous outer cavity 52, as shown in FIG. 6. Moldable material is introduced into the passageway 50 to fill the entire outer cavity 52 and eventually form the rotatable member or enclosure 28.

Referring back to FIGS. 4 and 5, each of the first 32 and second 34 central slides also includes an inner cavity portion 54, 56 that is divorced from the respective outer cavity half 42, 46 by a separating wall 59. Each inner cavity portion 54, 56 extends between opposing ends 60, 62.

The first end slide 36 includes an inboard surface, generally indicated at 64, extending between an upper end 66 and a lower end 68. The inboard surface 64 defines an inner cavity portion 70 along the lower end 68. The inner cavity portion 70 is continuous with the inner cavity portion 56 of the second central slide 34. In addition, when the joint formation assembly 30 is in the ready position, the inner cavity portion 70 closes around the inner cavity portion 54 at the end 60 thereof. The inboard surface 64 further defines an end cavity 72 that is shaped to form the tab 22. A passageway 74 is formed in the first end slide 36 for receiving moldable material that will eventually enter the inner cavity portions 54, 56 in order to form the stationary member 16.

The inboard surface 64 of the first end slide 36 also includes end portions 76, 78 on either side of the inner cavity portion 70. When the joint formation assembly 30 is in the ready position, as shown in FIGS. 6 and 7, the end portions 76, 78 abut the top surface 48 of the second central slide 34 to seal off the outer cavity half 46 and the passageway 50. As a result, moldable material entering the outer cavity half 46 from the passageway 50 is prevented from entering the inner cavity half 70 and the end cavity 72. Thus, the outer cavity half 46 is completely divorced from the inner cavity portions 56, 70.

The second end slide 38 also includes an inboard surface 80 extending between an upper end 82 and a lower end 84. The inboard surface 80 defines an inner cavity portion 86 along the upper end 82. The inner cavity portion 86 is continuous with the inner cavity portion 54 of the first central slide 32. Together, the inner cavity portions 54, 56, 70, 86 form an inner cavity 87. When the joint formation assembly 30 is in the ready position, the inner cavity portion 86 closes around the inner cavity portion 56 at the end 60 thereof. The inboard surface 80 further defines an end cavity 88 that is shaped to form the tab 24.

The inboard surface 80 of the second end slide 38 also includes end portions 90, 92 on either side of the inner cavity portion 86. When the joint formation assembly 30 is in the ready position, as shown in FIGS. 6 and 7, the end portions 90, 92 abut a bottom surface 94 of the first central slide 32 to seal off the outer cavity half 42. As a result, moldable material entering the outer cavity half 42 is prevented from entering the inner cavity portion 86 and the end cavity 88. Thus, the outer cavity half 42 is completely divorced from the inner cavity portions 54, 86. Because the outer cavity halves 46, 42 are divorced from the respective inner cavity portions 56, 70 and 54, 86, moldable material entering the outer cavity 48 from the passageway 50 is separated from moldable material entering the inner cavity portions 54, 56, 70, 86 and the end cavities 72, 88 from the passageway 74, which in turn allows the independent formation of the rotatable member 28 along the stationary member 16. It is this independent formation of the rotatable member or enclosure 28 that allows for rotation thereof about the stationary member 16.

It is contemplated that although a particular structure for the plurality of slides 32, 34, 36, 38 has been shown and described for forming the integral joint 10, the shape, size, configuration, and number of slides may vary depending upon the specific stationary and rotatable members to be molded.

In operation, the molding of the integral joint 10 begins with the movement of the joint formation assembly 30 into the ready position, shown in FIGS. 6 and 7. Moldable material is introduced into the first end slide 36 via the passageway 74. The moldable material fills the end cavities 72, 88 and the inner cavity portions 54, 56, 70, 86, which together form the inner cavity 87. The moldable material in the inner cavity 87 and the end cavities 72, 88 forms the stationary member 16 and the tabs 22, 24, respectively. Moldable material is also introduced into the second central slide 34 via the passageway 50. The moldable material fills the outer cavity 52 to form the rotatable member 28. It is appreciated that different moldable materials may be utilized to form the stationary member 16 and the rotatable member 28. The separating wall 59 and the end portions 76, 78, 90, 92 prevent the moldable material in the outer cavity 52 from entering the inner cavity 87. Thus, the rotatable member 28 independently and separately forms around the stationary member 16, which allows rotation of the rotatable member 28 about the stationary member 16. The end result is a permanent and flexible connection between the first part 12 and the second part 14.

The particular order in which the rotatable member or enclosure 28 and the stationary structure 16 are molded may vary. More specifically, the molding of the rotatable member or enclosure 28 and the stationary member 16 can occur either simultaneously or sequentially.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A method of molding an integral joint including a stationary member connected to a first part by spaced apart tabs and an enclosure connected to a second part and rotatable about the stationary member between the spaced apart tabs, said method comprising the steps of:
   provisioning a joint formation assembly defining an inner cavity extending between opposite first and second ends, end cavities in fluid communication with the respective first and second ends of the inner cavity, a first passageway connected to the inner cavity, an outer cavity surrounding the inner cavity, and a second passageway connected to the outer cavity;
   introducing moldable material into the inner cavity from the first passageway;
   filling the inner cavity with moldable material to form the stationary member;
   filling the end cavities with moldable material to form the tabs integral with the stationary member;
   introducing moldable material into the outer cavity from the second passageway;
   filling the outer cavity with moldable material to form the enclosure; and
   divorcing the inner cavity and end cavities from the outer cavity for separately and independently forming the enclosure around the stationary member and between the tabs to allow rotatable movement of the enclosure relative to the stationary member.

2. A method of molding as set forth in claim 1 including the step of sealing off the outer cavity to prevent moldable material in the outer cavity from entering the inner cavity.

3. A method of molding as set forth in claim 2 wherein:
   the outer cavity extends between opposing ends; and the step of sealing off the outer cavity includes
   blocking the opposing ends of the outer cavity to prevent moldable material in the outer cavity from entering the inner cavity.

4. A method of molding as set forth in claim 3 wherein the step of introducing moldable material into the inner cavity to form the stationary member includes the step of delivering the moldable material to at least one end of the inner cavity.

5. A method of molding as set forth in claim 4 wherein the step of introducing moldable material into the outer cavity to form the enclosure includes the step of delivering the moldable material to the outer cavity at a location between the opposing ends of the outer cavity.

6. A method of molding as set forth in claim 2 including the step of separating the first passageway from the second passageway to prevent moldable material in one of the first and second passageways from entering the other of the first and second passageways.

7. A method of molding as set forth in claim 6 wherein the step of introducing moldable material into the inner cavity from the first passageway to form the stationary member includes the step of filling the inner cavity and end cavities with a first moldable material and the step of introducing moldable material into the outer cavity from the second passageway to form the enclosure includes the step of filling the outer cavity with a second moldable material different from the first moldable material.

8. A method of molding as set forth in claim 1 wherein the steps of introducing moldable material into the inner cavity from the first passageway to form the stationary member and introducing moldable material into the outer cavity from the second passageway to form the enclosure occur simultaneously.

9. A method of molding as set forth in claim 1 wherein the steps of introducing moldable material into the inner cavity from the first passageway to form the stationary member and introducing moldable material into the outer cavity from the second passageway to form the enclosure occur sequentially.

10. A method of molding as set forth in claim 1 including the step of varying a space between the inner and outer cavities to increase or decrease the ability of the enclosure to rotate about the stationary member.

* * * * *